United States Patent
Wamprecht et al.

[11] Patent Number: 5,925,711
[45] Date of Patent: Jul. 20, 1999

[54] POLYAMINES AND THEIR USE IN AQUEOUS COATING COMPOSITIONS

[75] Inventors: Christian Wamprecht, Neuss; Hans-Josef Laas, Köln; Jürgen Meixner, Krefeld; Josef Pedain, Köln, all of Germany

[73] Assignee: Bayer Aktiengesellschaft, Leverkusen, Germany

[21] Appl. No.: 08/882,852

[22] Filed: Jun. 26, 1997

[30] Foreign Application Priority Data

Jul. 10, 1996 [DE] Germany ............ 196 27 826

[51] Int. Cl.⁶ ................................. C07C 209/16
[52] U.S. Cl. .................... 524/539; 524/591; 524/839; 524/840; 525/455
[58] Field of Search ............. 428/423.1, 425.1, 428/425.6, 425.8; 524/539, 591, 839, 840; 525/455

[56] References Cited

U.S. PATENT DOCUMENTS

| | | | |
|---|---|---|---|
| 4,769,436 | 9/1988 | Beck et al. | 528/75 |
| 5,075,370 | 12/1991 | Kubitza et al. | 524/591 |
| 5,098,983 | 3/1992 | Mosbach et al. | 528/59 |
| 5,191,012 | 3/1993 | Markusch et al. | 524/591 |
| 5,252,696 | 10/1993 | Laas et al. | 528/49 |
| 5,336,711 | 8/1994 | Schneider et al. | 524/507 |
| 5,387,642 | 2/1995 | Blum et al. | 524/591 |
| 5,552,477 | 9/1996 | Dhein et al. | 524/840 |
| 5,614,584 | 3/1997 | Schwan et al. | 524/591 |

FOREIGN PATENT DOCUMENTS

| | | |
|---|---|---|
| 2090144 | 8/1993 | Canada . |
| 2111927 | 6/1994 | Canada . |
| 2181767 | 1/1997 | Canada . |
| 159363 | 10/1985 | European Pat. Off. . |
| 0661320 A1 | 7/1995 | European Pat. Off. . |
| 4135571 | 5/1993 | Germany . |
| 4226242 | 2/1994 | Germany . |

*Primary Examiner*—D. S. Nakarani
*Attorney, Agent, or Firm*—Joseph C. Gil; Thomas W. Roy

[57] ABSTRACT

The present invention relates to polyamines which are the reaction products of a) unsaturated oligoesters containing an average of 2 to 4 double bonds per molecule and b) optionally other unsaturated compounds which are suitable as Michael addition acceptors and which contain an average of 1 to 4 double bonds per molecule, with c) (cyclo)aliphatic diamines which contain two primary amino groups, and d) optionally other amino-functional compounds which are suitable as Michael addition donors.

The present invention also relates to aqueous, two-component coating compositions containing as binder A) the polyamines according to the invention and B) water dispersible polyisocyanates, and to coatings obtained from these coating compositions.

16 Claims, No Drawings

POLYAMINES AND THEIR USE IN AQUEOUS COATING COMPOSITIONS

BACKGROUND OF THE INVENTION

1. Field of the Invention

The present invention relates to new polyamines, to a method for their preparation and to their use, optionally after neutralization with carboxylic acids, in combination with polyisocyanates as binders for aqueous coating compositions.

2. Description of the Prior Art

Aqueous two-component coating compositions are known and described, for example, in EP-A 0,358,979 (polyacrylate polyol dispersion and polyisocyanate), DE-A 4,129,951 (polyester or polyacrylate dispersion with a hydrophilic reactive thinner and polyisocyanate), DE-A 4,135,571 (dispersion of a mixture of hydrophilic polyester and hydrophilic polyacrylate, combined with a polyisocyanate), DE-A 4,226,242 (polyester dispersion and polyisocyanate), EP-A 0,443,138 (water dispersible polyisocyanates containing ionic hydrophilic groups), EP-A 0,496,205 (polyester/polyurethane dispersion and polyisocyanate), EP-A 0,540,985 (water dispersible polyisocyanates containing ionic hydrophilic groups), EP-A 0,543,228 (polyester/polyacrylate dispersion and polyisocyanate), EP-A 0,557,844 (emulsion copolymer polyol and polyisocyanate), EP-A 0,639,594 (hydroxyfunctional dispersion, at least partially neutralized with polyamines, and polyisocyanate) and EP-A 0,661,320 (cationically stabilized polyacrylate dispersion and polyisocyanate).

EP-A 0,505,889 describes aqueous dispersions of encapsulated polyisocyanates. These are produced by dispersing polyisocyanates in water and adding polyamines containing a plurality of amino groups, so that the polyisocyanate droplets are tightly encapsulated by an urea shell due to reaction. After the destruction of the urea shell around the polyisocyanate droplets, these stable polyisocyanate dispersions can undergo further reactions, e.g., with polyols. Coatings produced from coating compositions containing these polyisocyanate dispersions do not possess satisfactory resistance to water.

Generally, polyamines are not suitable co-reactants for polyisocyanates because a spontaneous reaction takes place with the formation of urea groups.

It has now been found that certain low molecular weight oligoesters which contain an average of 2 to 4 double bonds per molecule, optionally in admixture with other unsaturated compounds, can be reacted with (cyclo)aliphatic diamines by the Michael addition reaction to form polyamines which, optionally after neutralization with carboxylic acids, are water dispersible or water-soluble and can be combined with polyisocyanates, which have optionally been rendered hydrophilic, to form aqueous two-component coating compositions, which have a pot life of several hours. These oligoesters are produced either by the trans-esterification of maleic or fumaric acid di(cyclo)alkyl esters with di-, tri- or tetraols, or by the esterification of maleic anhydride or maleic or fumaric acid with di-, tri- or tetraols and monoalcohols.

Due to the fact that polyamines generally undergo a spontaneous reaction with polyisocyanates, the pot life of these new aqueous two-component coating compositions was completely surprising and could not have been predicted. Coatings prepared from these new coating compositions dry rapidly, are free from bubbles and are resistant to customary solvents and water after curing for only a short time.

SUMMARY OF THE INVENTION

The present invention relates to polyamines which are the reaction products of a) unsaturated oligoesters containing an average of 2 to 4 double bonds per molecule and b) optionally other unsaturated compounds which are suitable as Michael addition acceptors and which contain an average of 1 to 4 double bonds per molecule, with c) (cyclo)aliphatic diamines which contain two primary amino groups, and d) optionally other amino-functional compounds which are suitable as Michael addition donors.

The present invention also relates to aqueous, two-component coating compositions containing as binder A) the polyamines according to the invention and B) water dispersible polyisocyanates, and to coatings obtained from these coating compositions.

DETAILED DESCRIPTION OF THE INVENTION

The polyamines are prepared by initially preparing unsaturated oligoesters containing an average of 2 to 4 double bonds per molecule either by i) transesterifying maleic or fumaric acid di(cyclo)alkyl esters with di-, tri- or tetraols or ii) esterifying maleic anhydride or maleic or fumaric acid with di-, tri- or tetraols and monoalcohols, and then reacting these unsaturated oligoesters and optionally other unsaturated compounds which are suitable as Michael addition acceptors and which contain an average of 1 to 4 double bonds per molecule, with (cyclo)aliphatic diamines and optionally other amino-functional compounds which are suitable as Michael addition donors. These polyamines, optionally after neutralization with carboxylic acids, can be dissolved or dispersed in water.

The polyamines according to the invention are synthesized from the following compounds:

a) unsaturated oligoesters which i) are produced either by the transesterification of maleic or fumaric acid di(cyclo)alkyl esters with di-, tri- or tetraols, or by the esterification of maleic anhydride or maleic and/or fumaric acid with di-, tri- or tetraols and monoalcohols, ii) contain an average of 2 to 4 double bonds per molecule, and iii) function as Michael addition acceptors, b) optionally other unsaturated compounds which function as Michael addition acceptors, c) (cyclo)aliphatic diamines containing two primary amino groups ($NH_2$), which function as Michael addition donors and d) optionally other amino-functional compounds which function as Michael addition donors.

The unsaturated oligoesters a) are either transesterification products which are formed by the transesterification of maleic and/or fumaric acid di(cyclo)alkyl esters with di-, tri- and/or tetraols, or are esterification products of maleic anhydride, or maleic and/or fumaric acid with di-, tri- and/or tetraols and monoalcohols. The unsaturated oligoesters a) contain an average of 2 to 4, preferably 2 to 3 double bonds per molecule.

Preferred maleic or fumaric acid di(cyclo)alkyl esters which are suitable for the transesterification contain 1 to 8 carbon atoms in their (cyclo)alkyl radical, such as maleic acid dimethyl ester, maleic acid diethyl ester, maleic acid di-n-propyl ester, maleic acid diisopropyl ester, maleic acid di-n-butyl ester, maleic acid diisobutyl ester, maleic acid di-n-hexyl ester, maleic acid di-2-ethylhexyl ester, maleic acid dicyclohexyl ester, and the corresponding esters of fumaric acid. Maleic acid dimethyl ester, maleic acid diethyl ester and maleic acid di-n-butyl ester are especially preferred.

Di-, tri and/or tetraols which are suitable for the transesterification include linear or branched, saturated alcohols which optionally contain ether oxygen atoms, such as ethylene glycol, 1,2- and 1,3-propylene glycol, 1,4-, 1,3- and 2,3-butylene glycol, 1,6- and 2,5-hexanediol, 1,8-octanediol, neopentyl glycol, 1,4-bis-(hydroxy-methyl)-cyclohexane, diethylene glycol, triethylene glycol, tetraethylene glycol, polyethylene glycols, polypropylen glycols or glycols which contain ethylen and propylen units having number average molecular weights (which may be determined by end group analysis) of up to about 2000, preferably up to about 1000, glycerol, trimethylolpropane and pentaerythritol. Preferred alcohols are ethylene glycol, propylene glycol, diethylene glycol and polyethylene glycols having number average molecular weights of about 800. 1,4-butanediol, 1,6-hexanediol, neopentyl glycol, 1,4-bis-(hydroxymethyl)-cyclohexane and trimethyl-olpropane are particularly preferred.

The maleic and/or fumaric acid di(cyclo)alkyl esters and the di-, tri- and/or tetraols are used in the transesterification reaction in amounts such that 0.8 to 1.5, preferably 0.9 to 1.3, moles of maleic and/or fumaric acid di(cyclo)alkyl ester are present for each OH group of the alcohol component.

The transesterification is preferably conducted in the absence of a solvent at temperatures of 80 to 250° C., preferably 100 to 220° C. The monoalcohol formed in the transesterification reaction is preferably removed by distillation. Transesterification catalysts, which are preferably used during the reaction, include acids, bases and organic salts of metals, such as tin(II) dioctoate, dibutyltin oxide, dibutyltin-bis-(2-ethyl-hexyl-mercaptoacetate), dibutyltin-bis-(2-ethylhexoate), dibutyltin dichloride, butyl tin acid and mixtures thereof. Generally, trans-esterification proceeds almost quantitatively.

When preparing the unsaturated oligoesters by the esterification of maleic anhydride or maleic and/or fumaric acid with di-, tri- and/or tetraols and monoalcohols, maleic anhydride is the preferred carboxylic acid component. The di-, tri- and/or tetraols which are suitable for esterification are same as those compounds previously set forth for transesterification.

Monoalcohols which are suitable for esterification include monohydric, aliphatic, cycloaliphatic and araliphatic alcohols, which optionally contain ether oxygen atoms and which contain 1 to 18, preferably 1 to 12, and more preferably 1 to 9 carbon atoms. Examples include methanol, ethanol, 1- and 2-propanol, 1- and 2-butanol, iso-butanol, tert.-butanol, 1-, 2- and 3-pentanol, 2- and 3-methyl-1-butanol, 2,2-dimethylpropanol, 1-, 2- and 3-hexanol, 4-methyl-2-pentanol, 2-ethyl-1-butanol, 2,2-diethylpropanol, 1-octanol, 2-ethyl-1-hexanol, 1-nonanol, 3,5,5-trimethyl-1-hexanol, 1-decanol, 1-dodecanol, 1-tetradecanol, 1-hexadecanol, 1-octa-decanol, cyclohexanol, 2-, 3- and 4-methylcyclo-hexanol, hydroxymethylcyclo-hexane, 3,3,5-trimethylcyclohexanol, 4-tert.-butylcyclohexanol and benzyl alcohol. Mixtures of these monoalcohols and the corresponding monoalcohols which contain ether oxygen atoms can also be used. In order to impart special hydrophilic properties to the polyamines, mono-etherified polyethylene glycols, polypropylen glycols or glycols which contain ethylen and propylen units having a number average molecular weight up to 1000, preferably up to 800, can be used as the monoalcohols for the preparation of the unsaturated oligoesters.

When esterification is conducted in the absence of solvent with splitting off of water at temperatures of 80 to 260° C., preferably 100 to 240° C., and the water of reaction is distilled off, optionally under vacuum or in a stream of nitrogen. When esterification is conducted in solution, the water of reaction is removed azeotropically using a suitable solvent, such as benzene, toluene, xylene, isooctane or cyclohexane. Known esterification catalysts can be used and include acids such as p-toluene-sulphonic acid and sulphuric acid, and organic salts of metals such as tin(II) dioctoate or dibutyltin oxide.

Other unsaturated compounds b), which are optionally used for the production of the polyamines A), include compounds containing 1 to 4, preferably 1 to 3 and more preferably 2 to 3 double bonds per molecule. Examples include esters of acrylic and methacrylic acid, such as methyl (meth)acrylate, ethyl (meth)acrylate, n-butyl (meth) acrylate, isobutyl (meth)acrylate, 2-ethylhexyl (meth) acrylate, cyclohexyl (meth)acrylate, ethanediol di(meth) acrylate, butanediol di(meth)acrylate, hexanediol di(meth) acrylate, trimethylolpropane tri(meth)acrylate and pentaerythritol tetra(meth)acrylate; and di(cyclo)alkyl esters of maleic or fumaric acid, e.g., those used for the transesterification reaction. Esterification products of acrylic and/or methacrylic acid with mono- to tetrahydric alcohols, which contain ether oxygen atoms, are also suitable as component b). Examples include polyethylene glycols, polypropylen glycol or glycols which contain ethylen and propylen units having a number average molecular weight of up to 2000.

Compounds which are di- and trifunctionally unsaturated are preferred, such as ethanediol di(meth)acrylate, butanediol di(meth)-acrylate, hexanediol di(meth)-acrylate, trimethylolpropane tri(meth)acrylate and esterification products of acrylic and/or methacrylic acid with di- and triols which contain ether oxygen atoms, such as polyethylene glycols, polypropylen glycol or glycols which contain ethylen and propylen units having a number average molecular weight of up to about 1000. Especially preferred are ethanediol diacrylate, butanediol diacrylate, hexanediol diacrylate, trimethylolpropane triacrylate and esterification products of acrylic acid with di- and triols containing ether oxygen atoms, such as polyethylene glycols, polypropylen glycol or glycols which contain ethylen and propylen units having a number average molecular weight of up to about 800.

(Cyclo)aliphatic diamines c) are compounds containing two primary amino groups and corresponding to formula (I)

$$NH_2-R-NH_2 \qquad (I),$$

wherein

R represents a $C_2$–$C_{24}$ aliphatic or a $C_3$–$C_{24}$ cycloaliphatic radical, preferably an aliphatic radical containing 2 to 15 carbon atoms or a cycloaliphatic radical containing 6 to 15 carbon atoms, and more preferably an aliphatic radical containing 2 to 12 carbon atoms or a cycloaliphatic radical containing 6 to 13 carbon atoms.

Examples include ethylene diamine, 1,2-and 1,3-propylene diamine, 1,4-diamino-butane, 1,6-diaminohexane, 2,2,4- and 2,4,4-trimethyl-1,6- diaminohexane, 1,4diaminocyclohexane, 3-aminomethyl-3,
5,5-trimethylcyclohexylamine (isophorone diamine),
2-(aminomethyl)-3,3,5-trimethylcyclopentylamine, bis-(4-aminocyclo-hexyl)-methane, bis-(4-amino-3-methylcyclohexyl)-methane, 1-amino-1-methyl-3(4)-aminomethyl-cyclohexane, bis-(4-amino-3,5-diethylcyclohexyl)-methane, bis-amino-methyl-hexahydro-4,7-methanoindane, 2,3-, 2,4- and 2,6-diamino-1-methyl-cyclohexane, and mixtures thereof.

Other amino-functional compounds d), which may optionally be used, include aliphatic, cycloaliphatic and/or araliphatic monoamines which optionally contain ether oxygen atoms and which contain a primary or secondary amino group. Examples include methylamine, dimethyl-amine, ethylamine, methoxyethylamine, diethylamine, 1-aminopropane, di-n-propylamine, 2-aminopropane, diisopropyl amine, 1-aminobutane, di-n-butylamine, 2-aminobutane, isobutylamine, diisobutyl-amine, 1-amino-hexane, dodecylamine, octadecylamine, cyclohexylamine, dicyclo-hexyl-amine and benzylamine.

Also suitable are aliphatic, cycloaliphatic and/or heterocyclic diamines which contain a primary, a secondary and optionally a tertiary amino group, in which the secondary amino group may also be part of a ring system, such as N-methyl ethylenediamine, N-methyl propylene diamine, N-(2-aminoethyl)-piperazine and 3-amino-1,2,4-triazole; and aliphatic diamines which contain two primary and at least one secondary amino group, such as diethylenetriamine, triethylenetetramine, tetra-ethylenepentamine and bis-(3-aminopropyl)-amine; aliphatic, cyclo-aliphatic and/or heterocyclic diamines which contain at least two secondary amino groups, such as N,N'-dimethyl ethylenediamine, N,N'-dimethyl-1,4-diaminocyclohexane and 2,5-dimethylpiperazine; and aliphatic, cycloaliphatic and/or ariliphatic mono-amines which contain hydroxyl groups, such as 2-aminoethanol, 2-(methylamino)-ethanol, diethanolamine, 3-amino-1-propanol, 1-amino-2-propanol and 2-amino-2-methyl-1,3-propanediol.

Polyamines A) are produced by reacting unsaturated oligoesters a), and optionally of other unsaturated compounds b), with (cyclo)aliphatic diamines c) and optionally with other amino-functional compounds d) at 20 to 160° C., preferably 30 to 140° C., and most preferably at 40 to 120° C. The reaction may be conducted in the absence of solvent or preferably in an inert organic solvent or solvent mixture which is miscible with or which can be diluted with water.

Examples of suitable solvents include esters such as methyl glycol acetate or methoxypropylacetate; ketones such as acetone or methyl ethyl ketone; ether alcohols such as methyl glycol, ethyl glycol, isopropyl glycol or butyl glycol; ethers such as ethylene glycol dimethyl ether, diethylene glycol dimethyl ether or ethylene glycol methyl-tert.-butyl ether; heterocyclic compounds such as N-methyl-pyrrolidone; and mixtures thereof.

Polyamines A) contain an average of at least one, preferably at least 2 and more preferably 2 to 4 primary amino groups ($NH_2$). This functionality can be achieved by using suitable ratios of starting components a) to d). Preferred polyamines A) have an average of 1 to 6, preferably 1 to 4 and more preferably 2 to 4 primary amino groups ($NH_2$) and 3 to 12, preferably 3 to 10 and more preferably 4 to 10 secondary amino groups (NH) per molecule.

The total nitrogen content (N=14) of polyamines A) is 2.04 to 17.41%, preferably 2.82 to 13.63% and more preferably 3.66 to 12.36%. The content of primary amino groups ($NH_2$=16) is 0.39 to 6.53%, preferably 1.07 to 5.84% and more preferably 1.39 to 5.30%, and their content of secondary amino groups (NH=15) is 1.82 to 10.20%, preferably 2.01 to 9.12% and more preferably 2.6.1 to 8.28%.

Especially preferred polyamines A) are based exclusively on starting components a) and c) and contain an average of 2 to 6, preferably 2 to 5 and more preferably 2 to 4 primary amino groups ($NH_2$), and 2 to 12, preferably 2 to 10 and more preferably 2 to 9 secondary amino groups (NH) per molecule. Their total nitrogen content (N=14) is 1.92 to 13.79%, preferably 3.11 to 13.79% and more preferably 3.94 to 13.79%. Their content of primary amino groups ($NH_2$) is 0.73 to 7.88%, preferably 1.78 to 7.88% and most preferably 2.25 to 7.88%, and their content of secondary amino groups (NH=15) is 1.37 to 7.39%, preferably 1.76 to 7.39%, and most preferably 2.11 to 7.39%.

The reaction of components a) to d), a) to c), a) and c) or a), c) and d) is conducted, optionally in an inert solvent, until the theoretical solids content is almost reached or is completely reached.

In this respect, the sequence of addition of components a) to d) is not critical. Components a) and b) or c) and d) may also be added as a mixture. Components a), b), c) or d), or components a) and b) or c) and d), are preferably placed in the reaction vessel together and the remaining components are then added simultaneously or in succession.

In one preferred embodiment component c), or components c) and d), are placed in the reaction vessel, optionally in an inert solvent, and component a) or components a) and b) are then added in admixture or in succession at the selected reaction temperature. In another preferred embodiment, component c) is placed in the reaction vessel in an inert solvent, and component b) is subsequently added at the desired temperature, which is kept constant by cooling if necessary. After the completion of the reaction between components b) and c) has been checked by determining the solids content, component a) is added. The batch is then stirred at the selected temperature until the theoretical solids content is almost reached or is completely reached.

If only components a) and c) are reacted, it is not critical which component is placed in the reaction vessel and which component is added. However, component c) is preferably placed in the reaction vessel and component a) is added.

Polyamines A) are viscous or solid products ranging from colorless to yellow, which are readily soluble in the solvents previously set forth. If they are sufficiently hydrophilic, the solutions of the polyamines can be diluted with water so that the polyamines are present in a mixture of water and organic solvent.

If the polyamines according to the invention are not sufficiently hydrophilic, a portion of the amino groups which are present can be converted into ionic groups, e.g. with monocarboxylic acids. Examples of monocarboxylic acids which are suitable for neutralizing the amino groups include formic acid, acetic acid, propionic acid and lactic acid. While it is possible to neutralize all of the amino groups, it is often completely satisfactory if only a portion of the amino groups are neutralized with carboxylic acids, i.e, 5 to 50%, preferably 5 to 40% and more preferably 5 to 30%. These neutralized polyamines can readily be dissolved in water or solvent/water mixtures. The clear solutions, which have a solids content of 30 to 50%, generally have a low viscosity and are stable for several months.

Suitable co-reactants for polyamines A) for the production of crosslinked lacquers or coatings are water dispersible polyisocyanates B), which are based on aliphatic and cycloaliphatic diisocyanates. Examples of these diisocyanates are those having a molecular weight of 140 to 400, such as 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3-and 1,4-diiso-cyanatocyclohexane, 1-isocyanato-5-isocyanatomethyl-3,3,5-trimethyl-cyclohexane (isophorone diisocyanate), 2,3-, 2,4-and 2,6-diisocyanato-1-methylcyclohexane, 4,4'- and 2,4'-diisocyanatodicyclohexylmethane, 1-isocyanato-3(4)-isocyanatomethyl-1-methyl-cyclohexane and mixtures thereof.

In particular, water dispersible crosslinking component B) is selected from polyisocyanates (I), which are produced from the preceding diisocyanates, preferably contain biuret groups, allophanate groups, urethane groups, carbodiimide groups, uretdione groups and/or isocyanurate groups, and have been rendered hydrophilic.

These isocyanate group-containing compounds are described, e.g., in EP-A 0,003,505, DE-A 1,101,394, U.S. Pat. No. 3,358,010, U.S. Pat. No. 3,903,127, U.S. Pat. No. 4,324,879, U.S. Pat. No. 4,288,586, DE-A 3,100,262, DE-A 3,100,263, DE-A 3,033,860 and DE A 3,144,672.

In accordance with the present invention polyisocyanates, which are not water dispersible by themselves, can be used in admixture with external ionic or non-ionic emulsifying agents as water dispersible, crosslinking polyisocyanates (B).

Preferably self-dispersing polyisocyanates are in accordance with the present invention, especially water dispersible, non-ionic polyisocyanate mixtures (B1). These mixtures contain polyisocyanates and polyisocyanates modified with polyethers, and preferably contain cycloaliphatically and/or aliphatically bound isocyanate groups. Water dispersible polyisocyanate mixtures (B1) preferably have i) an average NCO functionality of 1.8 to 4.2,
ii) a content of aliphatically and/or cycloaliphatically bound isocyanate groups (calculated as NCO, molecular weight=42) from 12.0 to 21.5% by weight, based on the weight of the polyisocyanate mixture (B1), and
iii) a content of ethylene oxide units (calculated as $C_2H_4O$, molecular weight=44) present within polyether claims of 2 to 20% by weight, based on the weight of the polyisocyanate mixture (B1), wherein the polyether chains contain an average of 5 to 70 ethylene oxide units.

Water dispersible polyisocyanate mixtures (B1) can be obtained in known manner by the reaction of polyisocyanate component (I), which has an average NCO functionality of 2.1 to 4.4, preferably 2.3 to 4.3, and which contains one or more polyisocyanates containing aliphatically and/or cycloaliphatically bound isocyanate groups, with a mono- or polyhydric polyalkylene oxide polyether alcohol (II) which contains an average of 5 to 70 ethylene oxide units at an NCO/OH equivalent ratio of at least 2:1, preferably 4:1 about 1000:1. The qualitative and quantitative ratios of the starting components are selected such that the resulting products satisfy conditions i) to iii).

Polyisocyanate components (I) are those which contain uretdione, isocyanurate, urethane, allophanate, biuret and/or oxadiazinetrione groups, such as those described, for example, in DE-A 1,670,666, E-A 3,700,209, DE-A 3,900,053, EP-A 336,205 and EP-A 339,396.

Polyisocyanate components (I) are preferably selected from polyisocyanate mixtures which are prepared from 1,6-diisocyanato-hexane, contain isocyanurate groups and optionally uretdione groups and have an NCO content of 19 to 24% by weight, based on the weight of component (I).

More preferred are polyisocyanates which contain isocyanurate groups and are substantially free from uretdione groups, such as those obtained by the known catalytic trimerization of 1,6-diisocyanatohexane. These polyisocyanates preferably have an average NCO functionality of 3.2 to 4.2.

Component (II) is selected from mono- or polyhydric polyalkylene oxide polyether alcohols which contain an average of 5 to 70, preferably 6 to 60, ethylene oxide units per molecule, such as those which are obtained in known manner by the alkoxylation of suitable starter molecules. Any mono- or polyhydric alcohols having a molecular weight range 32 to 150, such as those described in EP-A 206,059, can be used as starter molecules for the production of polyether alcohols (II). Monofunctional alcohols containing 1 to 4 carbon atoms are preferably used as starter molecules. Methanol is particularly preferred.

Alkylene oxides which are particularly suitable for the alkoxylation reaction are ethylene oxide and propylene oxide, which can be used in any sequence or also as a mixture in the alkoxylation reaction.

Polyalkylene oxide polyether alcohols (II) are either pure polyethylene oxide polyethers or mixed polyalkylene oxide polyethers, which contain at least one polyether chain having at least 5, preferably 5 to 70, more preferably 6 to 60, and most preferably 7 to 20 ethylene oxide units, and wherein at least 60 mole %, preferably at least 70 mole %, of the alkylene oxide units are ethylene oxide units.

The preferred polyether alcohols (II) for the production of the water dispersible polyisocyanate mixtures B) are monofunctional polyalkylene oxide polyethers which are started on an aliphatic alcohol containing 1 to 4 carbon atoms and contain an average of 6 to 60 ethylene oxide units, more preferably pure polyethylene glycol monomethyl ether alcohols containing an average of 7 to 20 ethylene oxide units.

Suitable emulsifying agents for use in combination with polyisocyanates (I), which are not self-dispersing, are described, for example, in Methoden der Organischen Chemie, Houben-Weyl, Volume XIV/ 1, Part 1, pages 190–208, Georg-Thieme-Verlag, Stuttgart 1961 and in U.S. Pat. No. 3,428,592 or EP-A 13,112. The emulsifying agents are used in an amount which ensures dispersibility.

In order to facilitate their incorporation into the aqueous phase, the water dispersible polyisocyanates may optionally be dissolved in a solvent which is inert to isocyanate groups. Examples of suitable solvents include ethyl acetate, butyl acetate, ethylene glycol monomethyl- or -ethyl ether acetate, 1-methoxypropyl-2-acetate, 2-butanone, 4-methyl-2-pentanone, cyclohexanone, toluene, propylene glycol diacetate, diethylene glycol dimethyl ether, diethylene glycol ethyl- and -butyl ether acetate, N-methylpyrrolidone, N-methylcaprolactam and mixtures thereof. These solvents are optionally added to the water dispersible polyisocyanates in amounts of up to 90% by weight, preferably up to 50% by weight, and more preferably up to 20% by weight, based on the weight of the resulting solution. The use of solvent-free water dispersible polyisocyanates is preferred.

In order to produce the binder compositions, which are present in the coating compositions according to the invention, polyamine component A) and polyisocyanate component B) are mixed in amounts sufficient to provide an equivalent ratio of isocyanate groups to primary amino groups of 0.5:1 to 8:1, preferably 0.75:1 to 6:1 and more preferably 1.0:1 to 4:1.

The coating compositions may also contain known additives, e.g., pigments and extenders such as titanium dioxide, barium sulphate, chalk and carbon black; catalysts such as zinc octoate, tin octoate and dibutyltin laurate; levelling agents; thickeners; crosslinking and dispersing agents; stabilizers such as substituted phenols; and light stabilizers such as the sterically hindered amines described in DE-A 2,417,353, U.S. Pat. No. 4,123,418, U.S. Pat. No. 4,110,304, DE-A 2,456,864, U.S. Pat. No. 3,993,655 and U.S. Pat. No. 4,221,701.

At room temperature the coating compositions according to the invention are liquid dispersions which have a shelf life of several hours.

In order to produce coatings from the coating compositions according to the invention, the latter are applied in one or more layers by known methods, for example, by spraying, dipping, flooding or with the aid of rollers or doctor blades, to any heat resistant substrates. The coating compositions are suitable for coating metal, plastics, wood or glass. The substrates to be coated may be provided with suitable primer, coats before coating. The coating compositions are used in amounts sufficient to provide dry film thicknesses of about 5 to 100 µm, although thicker coats may be obtained.

The coating compositions are cured, depending on the application, at a temperature of 0 to 120° C., preferably 10 to 110° C. and more preferably 20 to 100° C. The cured coatings exhibit outstanding properties, particularly high hardness and very good resistance to solvents and water. They are preferably employed for coating wood and furniture, in general industrial coating operations, in automobile refinishing and for coating large vehicles, to provide corrosion protection and in the automotive industry as primer surfaces and top coats.

EXAMPLES

All parts and percentages are by weight unless otherwise indicated.

I. General preparation specification for unsaturated oligoesters a) (esterification method).

Maleic anhydride and the corresponding diol or polyol were weighed into a three-necked flask fitted with a stirrer, reflux condenser, thermometer and nitrogen inlet and were stirred at 80 to 150° C. until the anhydride band at about 1845 cm$^{-1}$ in the 1R spectrum had almost disappeared or completely disappeared. The corresponding monoalcohol, an esterification catalyst and a water entraining agent were then added. This addition was made at a temperature which was below the boiling temperature of the monoalcohol and of the entraining agent. The mixture was then boiled at the water separator trap until the theoretical amount of water had been collected, or until water was no longer collected. Thereafter, the entraining agent and any excess monoalcohol were completely distilled off under vacuum. The unsaturated oligoester remained behind as a colorless to light yellow, low viscosity liquid.

II. General preparation specification for unsaturated oligoesters a) (transesterification method).

The maleic acid di(cyclo)alkyl ester, the corresponding diol or polyol and optionally a transesterification catalyst were weighed into a three-necked flask fitted with a stirrer, thermometer, nitrogen inlet and distillation device, and were heated with stirring at about 100 to 180° C. until the (cyclo)alkanol started to split off. The reaction was continued until the theoretical amount of (cyclo)alkanol had distilled off, or until the separation of (cyclo)alkanol no longer occurred. Thereafter, the batch was cooled to room temperature and the unsaturated oligoester was obtained as an almost colorless liquid.

The compositions and the properties of the unsaturated oligoesters are set forth Table 1. Oligoesters 1 to 3 were synthesized by the esterification method and oligoesters 4 and 5 were synthesized by the transesterification method.

TABLE 1

Compositions and properties of unsaturated oligoesters a); amounts in g

| | Example No. | | | | |
|---|---|---|---|---|---|
| | 1 | 2 | 3 | 4 | 5 |
| Maleic acid dimethyl ester | — | — | — | 288 | 576 |
| Maleic anhydride | 196 | 294 | 294 | — | — |
| 1,6-hexanediol | 59 | — | — | 136 | — |
| Polyethylene glycol; MW 400 | 200 | 690 | — | — | 880 |
| Trimethylolpropane | — | — | 134 | — | — |
| n-butanol | 155 | 216 | 266 | — | — |
| Transesterification catalyst[1] | — | — | — | 0.08 | 0.26 |
| p-toluenesulphonic acid | 3.0 | 5.5 | 3.3 | — | — |
| Toluene | 260 | 500 | 200 | — | — |
| Acid number (mg KOH/g) | 5.6 | 5.8 | 4.6 | 1.0 | 0.8 |
| Viscosity at 23° C., mPa · s (DIN 53 019) | 202 | 602 | 324 | 283 | 675 |

[1]Fascat 4101 from Elf Atochem

III. General preparation specification for the polyamines A) according to the invention Part I was placed in a 2 liter, four-necked flask fitted with a stirrer, reflux condenser, thermometer and nitrogen inlet, and was heated to 60 to 80° C. Part II was then added over 1 hour. If part II was an unsaturated acrylate b), the batch was stirred for 1 hour at 80° C., part III was then added over 1 hour, and the batch was stirred at 80° C. until the theoretical solids content was reached. If part II was an unsaturated oligoester a), the batch was stirred at 80° C. until the theoretical solids content was reached, and part III was then optionally added over 1 hour; the batch was then stirred at 80° C. until the theoretical solids content was reached. Thereafter, part IV was added at 80° C. with intensive stirring, the batch was stirred for about an additional 15 to 30 minutes and was then cooled to room temperature to obtain polyamines A) as solutions having a yellowish color.

Table 2 gives the compositions and Table 3 gives the properties of the resulting polyamines according to the invention

TABLE 2

Compositions of aqueous polyamines A) according to the invention; amounts weighed in g

| | Polyamine | | | | | | |
|---|---|---|---|---|---|---|---|
| | A1 | A2 | A3 | A4 | A5 | A6 | A7 |
| Part I | | | | | | | |
| N-methylpyrrolidone | 71.8 | 133.8 | 59.2 | 70.1 | 93.8 | 79.4 | 100 |
| Isophorone diamine | 115.4 | — | 94.7 | 114.3 | — | 139.4 | 131.4 |
| 4,4'-diaminodicyclohexylmethane | — | 113.7 | — | — | 158.9 | — | — |
| Part II | | | | | | | |
| Trimethylolpropane triacrylate | 57.4 | 32.1 | — | 56.9 | 44.2 | 34.7 | 32.7 |
| Unsaturated oligoester from Example 3 | — | — | 94.9 | — | — | — | — |

TABLE 2-continued

Compositions of aqueous polyamines A) according to the invention; amounts weighed in g

| | Polyamine | | | | | | |
|---|---|---|---|---|---|---|---|
| | A1 | A2 | A3 | A4 | A5 | A6 | A7 |
| Part III | | | | | | | |
| Unsaturated Oligoester from Example | | | | | | | |
| No. 1 | — | — | — | 109.0 | 171.5 | — | — |
| No. 2 | 137.4 | 153.3 | 112.7 | — | — | — | — |
| No. 4 | — | — | — | — | — | 126.5 | — |
| No. 5 | — | — | — | — | — | — | 220 |
| Maleic acid dimethyl ester | — | — | — | — | — | 16.9 | 15.9 |
| Part IV | | | | | | | |
| Acetic acid (100%) | 18.0 | 10.1 | 8.4 | 16.6 | 28.1 | 27.7 | — |
| Water (deionized) | 600.0 | 557.0 | 630.1 | 633.1 | 503.5 | 575.4 | 500 |

TABLE 3

Properties of aqueous polyamines A) according to the invention

| | Polyamine | | | | | | |
|---|---|---|---|---|---|---|---|
| | A1 | A2 | A3 | A4 | A5 | A6 | A7 |
| Solids content, % | 30.5 | 29.7 | 29.5 | 29.4 | 39.7 | 34.2 | 40.1 |
| Equivalent weight, g/mole | | | | | | | |
| $NH_2$ + NH (calculated) | 952 | 1096 | 1027 | 936 | 957 | 849 | 647 |
| $NH_2$ + NH + $NH_3^+$ (calcd.) | 737 | 923 | 898 | 746 | 661 | 610 | — |

IV. Production of a water dispersible polyisocyanate B)

1.0 g·equiv. of a polyisocyanate which was prepared from 1,6-diisocyanato-hexane, contained isocyanurate groups and had an NCO content of 21.5 and a viscosity of 3000 mPa·s (23° C.) was mixed at room temperature, with stirring, with 0.08 g·equiv. of a monofunctional polyethylene oxide polyether which was started on methanol and had a number average molecular weight of 350 g/mole. Thereafter, the mixture was heated to 100° C. and stirred for 3 hours while the addition reaction took place. After cooling to room temperature, a practically colorless, clear, polyisocyanate mixture was obtained. The NCO content was 17.3%, and the viscosity was 3050 mPa·s (23° C.).

V. Example of use

Polyamines A1 to A7 were combined with the water dispersible polyisocyanate B) to provide an equivalent ratio of $NH_2+NH+NH_3$ groups to isocyanate groups was about 1:1.5. For this purpose, a dispersion was first prepared of the polyisocyanate in water, by metering the 100% solids polyisocyanate B), with stirring, into an amount of water sufficient to provide a 30% dispersion of the polyisocyanate in water. The polyisocyanate dispersion was intimately mixed with the aqueous polyamine solution and additional water, with intensive stirring, to provide coating compositions having a solids content of 25 to 30%. These mixtures had a shelf life of about 1 to 4 hours. Coatings having a wet film thickness of 240 μm were applied to glass plates and dried for 24 hours at room temperature.

Thereafter, the resistance to ethanol and water was determined by placing a swab saturated with either ethanol (1 minute) or water (20 minutes) on the coating and covering the swab with a watch glass. After exposure, the effect on the coating was assessed; a score of 0 means that the coating was completely undamaged, while a score of 5 means that the coating was damaged or detached at the exposed location.

In addition, the solvent-resistance of the films was also tested using a swab saturated in either ethanol or water. The number of double rubs set forth is the number before any visible change occurred to the coating. No more than 200 double rubs were performed per film.

Table 4 sets forth the compositions of binders 1 to 7 according to the invention, and also sets forth the hardness and the solvent-resistance of the coatings as an indication of the degree of crosslinking.

TABLE 4

Compositions and solvent resistance of coatings based on polyamines A1 to A7 according to the invention; Amounts in g

| | Example of use | | | | | | |
|---|---|---|---|---|---|---|---|
| | 1 | 2 | 3 | 4 | 5 | 6 | 7 |
| Polyamine A) | 15.0 g A1 | 15.0 g A2 | 15.0 g A3 | 15.0 g A4 | 15.0 g A5 | 15.0 g A6 | 15.0 g A7 |
| Polyisocyanate B) | 7.41 g | 5.92 g | 6.08 g | 7.32 g | 8.26 g | 8.95 | 8.44 |
| Water | 25.83 g | 20.70 g | 21.36 g | 23.76 g | 32.28 g | 30.87 g | 34.32 g |
| Hardness Oscillating bob damping (sec) | 175 | 168 | 156 | 178 | 163 | 173 | 185 |
| Etching propensity[1]: | | | | | | | |
| 1 minute in ethanol | 0 | 1 | 1 | 0 | 1 | 0 | 1 |
| 20 minutes in water | 0 | 0 | 0 | 0 | 0 | 0 | 1 |
| Wiping test; number of double rubs with: | | | | | | | |
| ethanol | 200 | 200 | 187 | 200 | 183 | 200 | 175 |
| water | 200 | 200 | 200 | 200 | 200 | 200 | 183 |

[1]0 = best result (coating without visible change)
5 = worst result (coating dissolved)

Discussion of the results:

Clear coatings with very good flow were produced with coating compositions containing polyamines A1 to A7 according to the invention and an unblocked polyisocyanate which had been rendered hydrophilic. After 24 hours at room temperature, the resulting coatings exhibited a high hardness and very good resistance to ethanol and water.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous, two-component coating composition containing as binder
   A) a polyamine which is the reaction product of
      a) an unsaturated oligoester containing an average of 2 to 4 double bonds per molecule and
      b) optionally another unsaturated compound which is suitable as a Michael addition acceptor and which contains an average of 1 to 4 double bonds per molecule, with
      c) a (cyclo)aliphatic diamine which contains two primary amino groups, and
      d) optionally another amino-functional compound which is suitable as a Michael addition donor and
   B) a water dispersible polyisocyanate.

2. The coating composition of claim 1 wherein
   i) unsaturated oligoester a) comprises the reaction product of maleic anhydride with a diol having a number average molecular weight of less than 1000 and an aliphatic monoalcohol containing 1 to 10 carbon atoms,
   ii) unsaturated compound b) comprises an ester of acrylic and/or methacrylic acid containing 2 to 4 double bonds per molecule and
   iii) (cyclo)aliphatic diamine c) corresponds to the formula

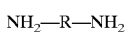
   NH₂—R—NH₂ wherein R represents a (cyclo)aliphatic radical containing 2 to 21 carbon atoms.

3. The coating composition of claim 2 wherein component c) comprises isophorone diamine and/or bis-(4-aminocyclohexyl)-methane.

4. The coating composition of claim 1 wherein starting component b) is present and comprises trimethylolpropane triacrylate.

5. The coating composition of claim 1 wherein
   i) unsaturated oligoester a) comprises the reaction product of maleic anhydride with a diol, triol or tetraol having a number average molecular weight of less than 1000 and an aliphatic monoalcohol containing 1 to 10 carbon atoms and
   ii) (cyclo)aliphatic diamine c) corresponds to the formula

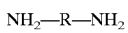
   NH₂—R—NH₂ wherein R represents a (cyclo)aliphatic radical containing 2 to 21 carbon atoms.

6. The coating composition of claim 5 wherein component c) comprises isophorone diamine and/or bis-(4-aminocyclohexyl)-methane.

7. The coating composition of claim 1 wherein (cyclo)aliphatic diamine c) corresponds to the formula

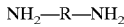
   NH₂—R—NH₂ wherein R represents a (cyclo)aliphatic radical containing 2 to 13 carbon atoms.

8. The coating composition of claim 1 wherein component c) comprises isophorone diamine and/or bis-(4-aminocyclohexyl)-methane.

9. An aqueous, two-component coating composition containing as binder
   A) a polyamine which is the reaction product of
      a) an unsaturated oligoester containing an average of 2 to 4 double bonds per molecule and
      b) optionally another unsaturated compound which is suitable as a Michael addition acceptor and which contains an average of 1 to 4 double bonds per molecule, with
      c) a (cyclo)aliphatic diamine which contains two primary amino groups, and
      d) optionally another amino-functional compound which is suitable as a Michael addition donor and
   B) a water dispersible polyisocyanate having
      a) an average NCO functionality of 1.8 to 4.2,
      b) a content of aliphatically and/or cycloaliphatically bound isocyanate groups of 12 to 21.5% by weight, based on the weight of polyisocyanate B) and
      c) a content of ethylene oxide units present within polyether chains of 2 to 20% by weight, based on the weight of polyisocyanate B).

10. The coating composition of claim 9 wherein
    i) unsaturated oligoester a) comprises the reaction product of maleic anhydride with a diol having a number average molecular weight of less than 1000 and an aliphatic monoalcohol containing 1 to 10 carbon atoms,
    ii) unsaturated compound b) comprises an ester of acrylic and/or methacrylic acid containing 2 to 4 double bonds per molecule and
    iii) (cyclo)aliphatic diamine c) corresponds to the formula

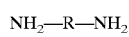
    NH₂—R—NH₂ wherein R represents a (cyclo)aliphatic radical containing 2 to 21 carbon atoms.

11. The coating composition of claim 10 wherein component c) comprises isophorone diamine and/or bis-(4-aminocyclohexyl)-methane.

12. The coating composition of claim 9 wherein starting component b) is present and comprises trimethylolpropane triacrylate.

13. The coating composition of claim 9 wherein
    i) unsaturated oligoester a) comprises the reaction product of maleic anhydride with a diol, triol or tetraol having a number average molecular weight of less than 1000 and an aliphatic monoalcohol containing 1 to 10 carbon atoms and
    ii) (cyclo)aliphatic diamine c) corresponds to the formula

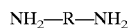
    NH₂—R—NH₂ wherein R represents a (cyclo)aliphatic radical containing 2 to 21 carbon atoms.

14. The coating composition of claim 13 wherein component c) comprises isophorone diamine and/or bis-(4-aminocyclohexyl)-methane.

15. The coating composition of claim 9 wherein (cyclo)aliphatic diamine c) corresponds to the formula

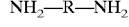
    NH₂—R—NH₂ wherein R represents a (cyclo)aliphatic radical containing 2 to 13 carbon atoms.

16. The coating composition of claim 9 wherein component c) comprises isophorone diamine and/or bis-(4-aminocyclohexyl)-methane.

* * * * *